United States Patent [19]

Swank et al.

[11] 4,006,025
[45] Feb. 1, 1977

[54] PROCESS FOR DISPERSING SENSITIZING DYES

[75] Inventors: Thomas F. Swank, Chelmsford; Richard Waack, Wayland, both of Mass.

[73] Assignee: Polaroid Corporation, Cambridge, Mass.

[22] Filed: June 6, 1975

[21] Appl. No.: 584,487

[52] U.S. Cl. .................................. 96/129; 96/114; 96/130; 96/137; 96/139; 96/140
[51] Int. Cl.$^2$ ...................... G03C 1/24; G03C 1/16
[58] Field of Search ............ 96/120, 130, 129, 139

[56] References Cited
UNITED STATES PATENTS

| | | | |
|---|---|---|---|
| 3,660,101 | 5/1972 | Owens et al. | 96/130 |
| 3,676,147 | 7/1972 | Boyer et al. | 96/130 |
| 3,822,135 | 7/1974 | Sakai et al. | 96/130 |
| 3,887,381 | 6/1975 | Shiba et al. | 96/130 |
| 3,912,517 | 10/1975 | Van Poucke et al. | 96/130 |

*Primary Examiner*—J. Travis Brown
*Attorney, Agent, or Firm*—Mart C. Matthews; Philip G. Kiely

[57] ABSTRACT

Colloidally stable dispersions of a spectral sensitizing dye are formed directly in water without the use of an organic solvent. The process of the invention involves mixing the dye particles with water to form a slurry and then homogenizing or milling the slurry at an elevated temperature in the presence of a surfactant to form finely divided particles uniformly dispersed in the water.

14 Claims, No Drawings

PROCESS FOR DISPERSING SENSITIZING DYES

BACKGROUND OF THE INVENTION

1. Field of the Invention

This invention relates to processes for forming aqueous dispersions of photographic spectral sensitizing dyes and more particularly to processes for directly dispersing substantially water-insoluble cyanine dyes directly in water to form solvent-free compositions useful in the spectral sensitization of photographic silver halide emulsions.

2. Description of the Prior Art

It is well known in the photographic art that most spectral sensitizing dyes for photosensitive materials are highly insoluble in water, yet are most advantageously incorporated in aqueous systems, such as dispersions of the photosensitive material in a hydrophilic binder such as gelatin. The majority of these spectral sensitizing dyes have thus been dissolved in a variety of organic solvents, notably the lower alcohols such as methanol and ethanol, before incorporation into the aqueous system; however, the use of these solvents has long been considered undesirable for a variety of reasons.

The relative insolubility of most of the spectral sensitizing dyes even in the organic solvents indicated above has required that relatively large quantities of solvent and/or elevated temperatures be employed in preparing sensitizing dye solutions possessing concentrations and solution stabilities suitable for commercial application. An aqueous colloidal system, such as a photographic gelatino silver halide emulsion, may be deleteriously affected by the addition of such solvents, for example by causing a local dehydration or coacervation of the binder material resulting in particulate matter which cannot be readily redispersed. The resultant effects are colloidal instability and coating defects when the colloidal system is coated on a support. Furthermore, the hazards of fire and explosion associated with the use of large quantities of flammable organic solvents of the type indicated cause considerable concern in the art, not only because of the danger involved in their use, but also because of the manufacturing facilities required to store and dispense them.

Aqueous spectral sensitizing dye compositions devoid of organic solvents are known to the art. Most notably, Owens et al. U.S. Pat. No. 3,660,101 discloses and claims substantially solvent-free dispersions of a spectral sensitizing dye in a hydrophilic colloid. However, prior art methods for preparing such dispersions require that the dye first be dissolved in an organic solvent to form a highly concentrated dye solution, which is subsequently added to the hydrophilic colloid and the solvent removed in some manner such as volatilization. Similar processes are described, for example, in Thomas U.S. Pat. No. 2,360,289 and Roth et al. U.S. Pat. No. 2,991,177.

It would, of course, be considered quite desirable if organic solvents could be eliminated completely, not only from the compositions used to spectrally sensitize the photographic emulsions, but from all aspects of the spectral sensitization procedure. It is to this end that the present invention is directed.

BRIEF SUMMARY OF THE INVENTION

In accordance with the present invention, a process is provided whereby a substantially water-insoluble spectral sensitizing dye, e.g., a cyanine dye, is dispersed directly in water without the necessity of first forming a solution of the dye in an organic solvent. The process of the invention comprises forming a slurry of solid dye particles in water at a concentration of about 0.5% to 30.0% dye, and then milling, or preferably homogenizing, the slurry at an elevated temperature, e.g., in the range from about 40° C. to about 50° C., in the presence of a surfactant, e.g., a water-soluble anionic surfactant in which the sensitizing dye is at least partially soluble, such as an alkyl naphthalene sulfonate. The resultant dispersion comprises finely divided uniformly dispersed dye crystals having particle sizes ranging from about 0.5 to about 1.0 $\mu$. The dispersion is useful for spectrally sensitizing a photographic material, such as a silver halide emulsion, in accordance with traditional procedures disclosed in the art.

The dispersions prepared according to this invention are colloidally stable and have the long shelf-life properties necessary for successful use in commercial manufacturing operations. To improve further the colloidal stability of the dispersion, an antiflocculating agent may be added to the dispersion during milling or upon any subsequent dilutions.

For a further understanding of the invention and illustrative examples, reference is made to the following detailed description.

DETAILED DESCRIPTION OF THE PREFERRED EMBODIMENT

As used herein and in the appended claims, the term "spectral sensitizing dyes" refers to compositions which extend the response of photosensitive materials to radiation to which the material normally is substantially insensitive. In general, the procedure of spectral sensitization of photosensitive material, and preferably sensitization of photosensitive silver halide, is accomplished by the adsorption onto surfaces of the photosensitive material of one or more of the aforesaid spectral sensitizing dyes selected from certain classes of dyes including, preferably, cyanine dyes and dyes related to them. For an extensive treatment of cyanine dyes particularly adapted to provide spectral sensitization of, for example, a photosensitive silver halide crystal, see Hamer, F. M., *The Cyanine Dyes and Related Compounds*, Interscience Publishers, New York, U.S.A. (1964); or, Mees, C. E. K., and James, T. H., *The Theory of the Photographic Process*, 3rd Edition, the Macmillan Co., New York, New York, U.S.A. (1966), pp. 198–232.

The invention is applicable to spectral sensitizing dyes which are substantially insoluble in aqueous solutions. Spectral sensitizing dyes with which the invention are concerned generally have a solubility in water (at about 20° C.) of less than 1% (weight of dye/weight of solution). Among the most useful spectral sensitizing dyes are the previously mentioned cyanine dyes, the hemicyanine or merocyanine dyes, styryl dyes and the like.

Preferred cyanine dyes are generally characterized by the formula:

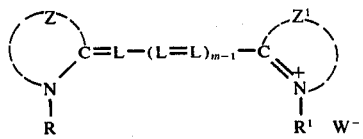

wherein L represents a methine group (e.g., —CH=, —C(CH₃)=, —C(Ø)=, etc.); m represents a positive integer from 1 to 3; Z and $Z^1$ each represent the nonmetallic atoms necessary to complete a heterocyclic ring system having a 5 or 6 membered nucleus; R and $R^1$ each represent substituted or unsubstituted alkyl, aryl, or aralkyl groups and W represents an anion. The invention has been found to be particularly useful for providing aqueous dispersions of various thiacyanine dyes, i.e., those dyes wherein either or both of Z and $Z^1$ are selected from the benzothiazole series, and especially those thiacyanine dyes having sulfoalkyl substituents in the R and/or $R^1$ positions. Examples of such thiacyanine dyes include symmetrical 2,2'-thiacyanine dyes such as described, for example, in Sprague U.S. Pat. No. 2,503,776; and unsymmetrical benzimidazolothiacarbocyanine dyes such as described, for example, in the copending application of Borror et al., Ser. No. 430,222 filed Jan. 2, 1974. Preferred dyes of the former class are useful for sensitizing silver halide to the blue region of the spectrum whereas those of the latter class are generally useful for sensitizing silver halide to the green region.

It is known that in order to obtain dye dispersions which function satisfactorily in the spectral sensitization of photographic emulsions and which remain in stable suspension during storage, the particle size of the dye crystals must be relatively small, for example, less than 1 micron. As previously discussed, this small particle size has heretofore been obtained by heating an organic solvent to a high temperature to dissolve the dye in as high a concentration as possible, and then dispersing the concentrated dye droplets, possibly with the help of a surfactant, in a suitable binder such as a hydrophilic colloid. When the solvent vaporizes from the colloid, a fine dispersion of small dye crystals may be provided without any milling or homogenizing required, and this dispersion can be used to spectrally sensitize the photosensitive material.

In accordance with this invention, it has been found that a dispersion having the requisite small particle size may be readily prepared without an organic solvent by milling or homogenizing at an elevated temperature an aqueous slurry which has been formed by mixing the dye directly with water, in the presence of a small quantity of a surfactant, i.e., a wetting or dispersing agent, preferably one in which the dye is at least partially soluble. Apparently, the combination of high dispersion temperature and surfactant may reduce the particle size to the required range by both a grinding and a dissolution mechanism.

Surfactants useful in the present invention are readily available commercially and comprise conventional watersoluble anionic wetting agents. The term "solubilizing surfactant" is used herein including the claims to designate a surfactant which will at least partially dissolve the dye being dispersed at the dispersion temperature, i.e., between about 40° C. and 50° C. Dye solubilities of a few hundredths of a percent, e.g., .001–0.10% (weight of dye/weight of solution) in the surfactant at room temperature are typical. Various sulfonated alkyl aryl products presently being sold by a wide variety of manufacturers have been found to be particularly advantageous and are illustrated, for example, by the alkyl naphthalene sulfonate products sold as Alkanol B and Alkanol BG by Du Pont and Aerosol OS by American Cyanamid. As further examples of several solubilizing surfactants suitable for the practice of this invention, which are listed for purposes of illustration and not limitation of the invention, mention may be made of the following:

|  | Trade Name | Manufacturer | Chemical Identification |
|---|---|---|---|
| 1. | Arkolene GN | Arkansas Co., Inc. | alkyl aryl sulfonate |
| 2. | Arkotan | Arkansas Co., Inc. | ammonium salt of a naphthalene sulfonic acid-formaldehyde complex |
| 3. | Daxad 11KLS | W. R. Grace & Co. | polymerized potassium salts of alkyl naphthalene sulfonic acids |
| 4. | Sellogen HR | Nopco Chemical | sodium dialkyl naphthalene sulfonate |
| 5. | Sellogen W | Nopco Chemical | sodium alkyl naphthalene sulfonate |
| 6. | Nopcosant | Nopco Chemical | sulfonated naphthalene |
| 7. | Lanitol A | Arkansas Co., Inc. | alkyl aryl sulfonate |
| 8. | Aerosol TR | American Cyanamid | tridecyl ester of sodium sulfosuccinic acid |
| 9. | Tamol 731 | Rohm and Haas Co. | sodium salt of polymeric carboxylic acid |
| 10. | Lomar D | Nopco Chemical | sodium salt of a condensed mono naphthalene sulfonic acid |
| 11. | varied | varied | sodium dodecylsulfate |
| 12. | Aerosol 22 | American Cyanamid | tetrasodium N-(1,2-dicarboxyethyl)-N-octyldecylsulfosuccinamate |
| 13. | Miranol H2MSF | Miranol Chemical | sodium salt of a dicarboxylic lauric derivative |

In preparing dye dispersions according to the present invention, the dry dye, which may have an initial particle size on the order of about 30 μ, is generally weighed out in a quantity sufficient to give a concentration in the range from about 0.5 to about 30% in the dispersion, and preferably on the order of about 10%. (As previously indicated, all percentages in the instant description and in the appended claims are given on a weight/weight basis, i.e., the weight of dye divided by the total weight of the dispersion or solution). The dye may then be mixed with the desired amount of water, a small quantity of the surfactant and, if desirable or necessary for a stable dispersion, a very small quantity of an antiflocculating agent, i.e., a material which will help to prevent flocculation of the dispersed dye particles such as a protective colloid. Advantageous results have been obtained with a quantity of surfactant equal to about 5% of the dye amount and, if used, a quantity of an antiflocculating agent such as polyvinyl pyrrolidone equal to less than about 0.05% of the dye amount. The aqueous slurry thus prepared may be then agitated and charged into conventional milling apparatus.

Dispersion of the dye particles in the water may be accomplished in a conventional colloid or "Kady" mill, but most preferably is accomplished using a 2-stage homogenizer such as available from Gaulin, Inc., Everett, Massachusetts. Such devices function by continuously forcing a quantity of the aqueous dye slurry through small openings in a plate so as to impinge on valve seats in each of two separate stages. The impact acts to reduce the particle size and uniformly disperse the dye particles. Generally, the first stage pressure may be in the range of about 8000 psi, with the second stage pressure on the order of about 500 psi. Suitable dispersions are obtained after from about 50 to 100 passes through the homogenizer, with the usual number of passes falling within the range of 70 to 80.

As previously indicated, temperature control during the milling process is important, and therefore the temperature should range between 40° C. and 50° C., preferably about 45° C. ± 3° C. Too low a temperature may result in a slower rate of particle reduction and an unequilibrated dispersion whereas too high a temperature may result in a dispersion having a greater tendency toward particle regrowth and resultant instability.

The dispersions of sensitizing dye may be diluted to a lesser concentration than used for milling, i.e., less than about 1% dye and preferably about 0.6% dye. The diluted dispersion then may be incorporated in a melted photographic emulsion, e.g., a gelatino silver halide emulsion, shortly before coating to spectrally sensitize the system in a manner which is well known to those skilled in the photographic art.

Dispersions prepared according to the invention generally exhibit good shelf-life stability characteristics when stored at the milling concentration, e.g., about 10% dye. As previously mentioned, it may be considered advantageous, and in certain cases necessary, to include a small amount of an antiflocculating agent in the dispersion during milling to provide dispersions of improved temperature and storage stability, and to retard the regrowth of dye crystals in the dispersion. Whenever the milling concentration is reduced by one-half or more, e.g., as before addition to the emulsion, needle-like crystals may tend to grow in the dispersion to such a large size that agglomeration and attendant settling of the dispersion may occur. Accordingly, diluted dispersions should be used a relatively short time (a couple of weeks) after dilution. In order to obtain a shelf-life of several weeks in the diluted state, e.g., concentrations ranging from 0.3% to 1.0% dye, antiflocculating additives may be included during the dilution to obtain long term colloidal stability. For example, a small amount (e.g., 10% of the quantity of dye) of polyvinyl pyrrolidone, or a small amount (e.g., 0.04% of dye weight) of a dilute inorganic salt solution such as an aqueous solution of $K_2SO_4$ may be added to the dispersion. When using the salt solution, it is to be noted that the dispersion should be diluted first with the desired amount of water, and then the salt solution added. It is inadvisable to add the salt solution to the concentrated dispersion since flocculation of the dispersion by the salt may occur.

Photosensitive materials which can be spectrally sensitized using the dispersions of the present invention include silver halide, such as silver bromide, silver chloride, silver iodide, etc., and mixed silver halides such as silver chloroiodide, silver bromoiodide and silver chlorobromide. The present invention is also contemplated as being suitable for the spectral sensitization of other photosensitive materials such as $TiO_2$ and ZnO. The photosensitive material to be sensitized may be dispersed or suspended in a hydrophilic colloid binder such as gelatin according to traditional procedures of the art, or the dispersions of the invention may be applied over binderfree deposits of the photosensitive material, for example a light-sensitive silver halide layer vacuum deposited on a support.

The invention will be further illustrated by the following examples which are presented solely for the purpose of illustration and are not intended to limit the invention to the details therein set forth.

EXAMPLE I

An aqueous dispersion of the cyanine dye anhydro-5'-chloro-3-ethyl-3'-β-sulfobutylthiacyanine hydroxide was prepared in accordance with the present invention as follows:

About 85 g of an aqueous 10% Alkanol BG solution, 1450 g of water, 6.8 g of an aqueous 1% polyvinylpyrrolidone solution and 170 g of the above-mentioned cyanine dye were agitated into a slurry. The slurry was charged into a Gaulin lab scale homogenizer and homogenized at 8000 psi and 45°–50° C. for 85 passes to form the dye dispersion. After homogenization, 170 g of an aqueous 10% polyvinylpyrrolidone solution was added to the dispersion to minimize subsequent crystal growth upon storage.

Part of the above dispersion was diluted with water to a concentration of 0.565%, and used to sensitize a gelatino silver iodobromide photographic emulsion by adding the dispersion to the melted emulsion at a rate of 2.0 mg of dye/g of silver.

A corresponding gelatino silver iodobromide emulsion was sensitized in the conventional manner to serve as a control by adding the above-mentioned cyanine dye at the same rate to the emulsion from a trifluoroethanol solution, in accordance with the procedure generally described, for example, in U.S. Pat. No. 3,756,830.

Both test and control emulsions were respectively included as the blue-sensitive emulsion layer in otherwise identical multicolor photosensitive film units, essentially of the type designated SX-70, sold by Polaroid Corporation, Cambridge, Massachusetts. The test and control film units were identically exposed in an intensity scale sensitometer, processed into a diffusion transfer color print and the resultant sensitometry evaluated. Table 1 below summarizes the values obtained for selected sensitometric parameters, expressed in log E units.

TABLE 1

|  | Maximum Blue Density | Minimum Blue Density | Blue Speed |
| --- | --- | --- | --- |
| Control | 1.97 | 0.20 | 1.55 |
| Test | 1.98 | 0.20 | 1.52 |

It can be seen from Table 1 that the sensitization provided by the dispersion of the present invention is essentially equivalent to that provided by the sensitizing dye solution of the prior art. Comparable results were obtained after corresponding film units were aged for one month before processing and sensitometric evaluation.

Example I illustrates the dispersion of a sensitizing dye in the presence of a small amount of a protective colloid, i.e., polyvinyl pyrrolidone. The following example illustrates a direct dispersion of a sensitizing dye without the use of such a protective colloid.

EXAMPLE II

An aqueous dispersion of the cyanine dye anhydro-5,6-dichloro-1,3-diethyl-3'-(4''-sulfobutyl)benzimidazolothiacarbocyanine hydroxide was prepared in the following manner:

About 50 g of the dry dye powder was wetted with 16.6 gms of a 15% dialyzed aqueous solution of Daxad 11KLS, and then 433.3 g of water were added and blended into a slurry. The slurry was charged into a lab scale Gaulin homogenizer and homogenized at 8000 psi and 45° C. for 80 passes to form the dye dispersion having approximately a 10% dye concentration.

About 223 g of the above dispersion was diluted to 0.388% by adding 6110.7 g of water and 263.9 g of a 10% aqueous solution of $K_2SO_4$. The salt was added to prevent crystal regrowth in the diluted dispersion.

The above diluted dispersion was added to a gelatino silver iodobromide photographic emulsion at a rate of 1.48 mg of dye per g of silver, and coated in the green-sensitive emulsion layer of an SX-70 format film unit as described in Example I above. To serve as control, a corresponding emulsion was sensitized by adding the same level of dye to the emulsion from a trifluoroethanol solution and the sensitized emulsion included in an otherwise identical film unit. The test and control film units were exposed, processed and evaluated as in Example I, to give the sensitometric results summarized in log E units in Table 2.

TABLE 2

|  | Maximum Green Density | Minimum Green Density | Green Speed |
| --- | --- | --- | --- |
| Control | 2.34 | 0.16 | 1.70 |
| Test | 2.30 | 0.16 | 1.70 |

The above data again clearly show that the sensitization provided by a dispersion of the present invention compares favorably with that provided by a solution of the dye in an organic solvent; however, as previously stated, sensitization of the emulsion in accordance with this invention is accomplished in the absence of organic solvents and the various problems associated therewith.

Since certain changes may be made in the above described subject matter without departing from the scope of the invention herein involved, it is intended that the above description shall be interpreted as illustrative and not in a limiting sense.

What is claimed is:
1. A process for forming a colloidally stable dispersion of a spectral sensitizing dye directly in water, which comprises the steps of:
   a. mixing substantially water-insoluble spectral sensitizing dye particles with water in the absence of an organic solvent to form a slurry having a dye concentration of about 0.5% to about 30% on a weight/weight basis; and
   b. homogenizing or milling said slurry at an elevated temperature of from about 40° C. to about 50° C. in the presence of a surfactant to provide finely divided dye particles having particle sizes in the range from about 0.5 to about 1.0 $\mu$ which are uniformly dispersed in said water.
2. A process as defined in claim 1 wherein said sensitizing dye is a cyanine dye.
3. A process as defined in claim 2 wherein said cyanine dye is a thiacyanine dye.
4. A process as defined in claim 1 wherein said surfactant is a solubilizing surfactant.
5. A process as defined in claim 4 wherein said solubilizing surfactant is an alkyl naphthalene sulfonate.
6. A process as defined in claim 1 wherein said surfactant is presented at about 5% of the quantity of said sensitizing dye.
7. A process as defined in claim 1 wherein said homogenizing or milling step is carried out in the presence on an antiflocculating agent.
8. A process as defined in claim 7 wherein said antiflocculating agent is polyvinyl pyrrolidone present in a quantity less than about 0.05% of the dye amount.
9. A process as defined in claim 1 wherein the dye concentration of said slurry is about 10%.
10. A process as defined in claim 1 wherein said temperature is 45° C. ± 3° C.
11. A process for spectrally sensitizing a photographic silver halide emulsion which comprises:
   a. mixing substantially water-insoluble particles of a silver halide spectral sensitizing dye with water to form a slurry having a dye concentration of about 10% on a weight/weight basis;
   b. homogenizing or milling said slurry at an elevated temperature of from about 40° C. to about 50° C. in the presence of an alkyl aryl sulfonate surfactant, present at about 5% of the quantity of said dye, to provide finely divided dye particles having particle sizes in the range from about 0.5 to about 1.0 $\mu$ which are uniformly dispersed in said water;
   c. diluting said dispersion with water to a concentration less than 1% on a weight/weight basis; and
   d. incorporating said diluted dispersion into a melted silver halide emulsion thereby to spectrally sensitize said emulsion.
12. A process as defined in claim 11 wherein said sensitizing dye is a thiacyanine dye.
13. A process as defined in claim 11 wherein said homogenizing or milling step is carried out in the presence of polyvinyl pyrrolidone in a quantity less than about 0.05% of the dye amount.
14. A process as defined in claim 11 wherein a small quantity of a dilute salt solution is added to the dispersion after the dilution step to improve the colloidal stability of said diluted dispersion.

* * * * *